United States Patent
Chinen et al.

(10) Patent No.: US 8,214,673 B2
(45) Date of Patent: Jul. 3, 2012

(54) POWER SAVING METHOD FOR COMPUTER SYSTEM

(75) Inventors: Mitsuru Chinen, Tokyo (JP); Tomohiro Miyahira, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 638 days.

(21) Appl. No.: 12/401,490

(22) Filed: Mar. 10, 2009

(65) Prior Publication Data
US 2009/0228724 A1 Sep. 10, 2009

(30) Foreign Application Priority Data
Mar. 11, 2008 (JP) .................. 2008-061675

(51) Int. Cl.
*G06F 1/32* (2006.01)
*G06F 1/00* (2006.01)
*G06F 15/173* (2006.01)
(52) U.S. Cl. ......... 713/323; 713/320; 713/324; 709/224
(58) Field of Classification Search .................. 713/300, 713/320, 323, 324; 710/18, 105; 709/224, 709/226, 228, 232, 233
See application file for complete search history.

(56) References Cited

U.S. PATENT DOCUMENTS

| | | | | |
|---|---|---|---|---|
| 2002/0004913 A1* | 1/2002 | Fung | | 713/300 |
| 2002/0133728 A1* | 9/2002 | Agarwal | | 713/324 |
| 2003/0221026 A1* | 11/2003 | Newman | | 710/8 |
| 2004/0003303 A1* | 1/2004 | Oehler et al. | | 713/300 |
| 2004/0163000 A1* | 8/2004 | Kuhlmann et al. | | 713/300 |
| 2005/0136867 A1* | 6/2005 | Carballo | | 455/127.1 |
| 2005/0203910 A1* | 9/2005 | Taguchi et al. | | 707/10 |
| 2006/0282687 A1* | 12/2006 | Bahali et al. | | 713/300 |
| 2007/0280239 A1* | 12/2007 | Lund | | 370/392 |
| 2008/0162964 A1* | 7/2008 | Dahlen et al. | | 713/320 |

FOREIGN PATENT DOCUMENTS

| | | | |
|---|---|---|---|
| JP | 09097128 A | * | 4/1997 |
| JP | 2000194436 A | * | 7/2000 |
| JP | 2006072650 | | 3/2006 |
| JP | 2007066073 A | * | 3/2007 |
| JP | 2008141290 | | 6/2008 |

* cited by examiner

*Primary Examiner* — Thomas J Cleary
(74) *Attorney, Agent, or Firm* — Steven E. Bach

(57) ABSTRACT

A server system, method, and program product are provided for setting a power level of a central processing unit (CPU) included in the server computer system—the CPU being operable at a plurality of levels of power, and the server providing a service that follows a predetermined protocol identified by a port number to a client computer via a computer network. The method includes the steps of monitoring connection establishment or close of communication with the client computer and a port number for the established or closed communication, determining a power level to be set as the power level of the CPU in accordance with the port number, and setting the determined power level as the power level of the CPU.

13 Claims, 9 Drawing Sheets

| Time | Client IP Address | Destination Port No. | Power Level |
|---|---|---|---|
| 2008/xx/xx | xxx.xxx.xx.xxx | 20 | 3 |
| 2008/xx/xx | yyy.yyy.yy.yyy | 21 | 1 |
| ... | ... | ... | ... |

| Port No. | Power Level |
|---|---|
| 20 (FTP Data) | 3 |
| 21 (FTP Control) | 1 |
| 22 (ssh) | 3 |
| 23 (telnet) | 1 |
| 25 (SMTP) | 1 |
| 53 (DNS) | 2 |
| 80 (HTTP) | 1 |
| Others | 2 |

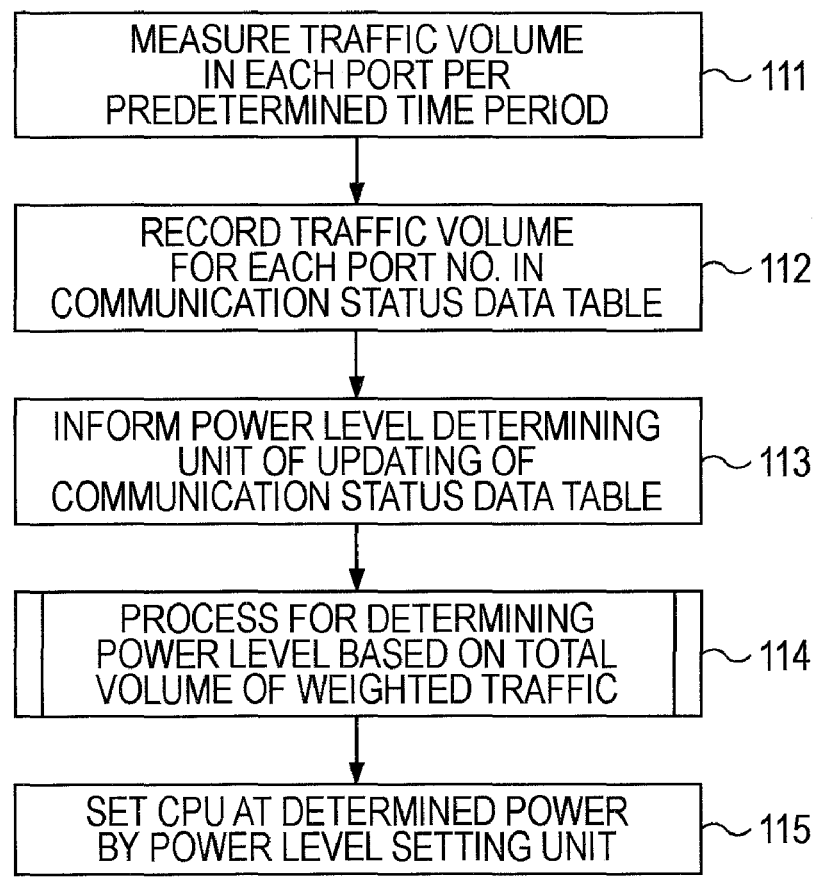

FIG. 16

| | Time | Maximum Weighted Number of Packets | Second Table | | Total Weighted Number of Packets | Power Level |
|---|---|---|---|---|---|---|
| a | $t_0$ | 20 | Total Weighted Number of Packets | Power Level | 20 | 3 |
| | | | 0 - 6.6 | 1 | | |
| | | | 6.6 - 13.3 | 2 | | |
| | | | 13.3 - 20 | 3 | | |
| b | $t_1$ | 20 | Total Weighted Number of Packets | Power Level | 10 | 2 |
| | | | 0 - 6.6 | 1 | | |
| | | | 6.6 - 13.3 | 2 | | |
| | | | 13.3 - 20 | 3 | | |
| c | $t_2$ | 60 | Total Weighted Number of Packets | Power Level | 60 | 3 |
| | | | 0 - 20 | 1 | | |
| | | | 20 - 40 | 2 | | |
| | | | 40 - 60 | 3 | | |
| d | $t_3$ | 60 | Total Weighted Number of Packets | Power Level | 30 | 2 |
| | | | 0 - 20 | 1 | | |
| | | | 20 - 40 | 2 | | |
| | | | 40 - 60 | 3 | | |

POWER SAVING METHOD FOR COMPUTER SYSTEM

FIELD OF THE INVENTION

The present invention relates to a power saving method for a computer system, and more specifically, it relates to a power saving method achieved by operating a central processing unit (CPU) at an optimal power by switching the power level of the CPU, particularly, the clock frequency and/or the voltage value of the CPU in accordance with the content of a service identified by a port number and the traffic volume thereof.

BACKGROUND

While the operating frequency of CPUs in computer systems is increasing and the performance thereof is improving, an increase in power consumption and heat generation caused by the CPU becomes a problem. In particular, this problem is serious in the case of a CPU of a server that processes a large amount of data.

Examples of known methods of controlling the power level of a CPU include CPU throttling (frequency switching) and operating-voltage switching. Another example is a standardized method of controlling these items using advanced configuration and power interface (ACPI). In general, throughput of a CPU reduces with a reduction in the power level, so it is not good to simply reduce the power level, except when, for example, the CPU is in a standby state.

Proposed approaches to controlling the power level of a CPU include: a method of driving a fan for cooling a CPU in response to an operation from a user and turning on a throttling function of the CPU (Japanese Unexamined Patent Application Publication No. 2007-66073); and a method of changing the operating speed of a CPU in accordance with the amount of unprocessed messages (Japanese Unexamined Patent Application Publication No. 2000-194436). However, these methods are not proactive because they are countermeasures taken after the temperature of the CPU rises or the amount of unprocessed messages becomes large. Another disclosed approach is a method of automatically changing the power of a CPU while monitoring an asynchronous bus cycle to a peripheral device (Japanese Unexamined Patent Application Publication No. 9-97128). However, this approach merely reduces the power of the CPU or stops the operation thereof.

SUMMARY

Accordingly, an object of the present invention is to provide a power saving method achieved by changing the power level of a CPU automatically and proactively in response to the content of processing and throughput that are continuously varying.

This and other advantages are provided by one or more embodiments of the present invention. A server computer system is provided that includes a central processing unit (CPU) operable at a plurality of levels of power and providing a service that follows a predetermined protocol identified by a port number to a client computer via a computer network. The server computer system includes a communication monitoring unit for monitoring a status of communication with the client computer and retaining a communication status data table that contains a connection ID and a port number for the communication, a power level determining unit for determining a power level to be set as a power level of the CPU on the basis of data in the communication status data table, and a power level setting unit for setting the power level of the CPU to the determined power level.

Another aspect of the present invention is a method that method sets a power level of a central processing unit (CPU) included in a server computer system. The CPU is operable at a plurality of levels of power. The server computer system provides a service that follows a predetermined protocol identified by a port number to a client computer via a computer network. The method includes a monitoring step of monitoring connection establishment of or connection close of communication with the client computer and a port number for the established or closed connection, a determining step of determining a power level to be set as the power level of the CPU in accordance with the port number, and a setting step of setting the power level of the CPU to the determined power level.

According to the aspects of the present invention described above, the power level of the CPU is automatically changeable to a suitable level responsive to an application being processed and throughput thereof, and power savings are thereby attained.

BRIEF DESCRIPTION OF THE DRAWINGS

FIG. 11 is a flowchart of a process for setting a power level according to the second embodiment of the present invention.

FIG. 12 illustrates an example communication status data table according to the second embodiment of the present invention.

FIG. 16 is a table illustrating how the power level is switched using the second table according to the second embodiment of the present invention.

DETAILED DESCRIPTION

Figure 1:
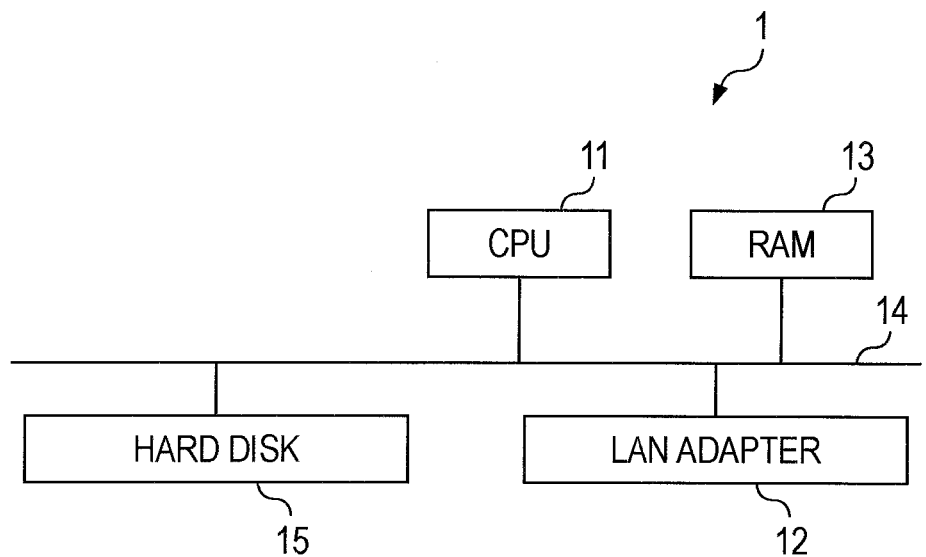
FIG. 1 is a block diagram that illustrates an example structure of a server computer system according to an aspect of the present invention.

FIG. 1 is a block diagram that illustrates one example structure of a server computer system 1 according to an aspect of the present invention (hereinafter referred to as a "server 1"). The server 1 includes a central processing unit (CPU) 11, a local area network (LAN) adapter 12, a memory 13 (e.g., random-access memory (RAM)), and a hard disk 15. These components are connected to each other via a system bus 14.

The power level of the CPU 11 (hereinafter sometimes referred to simply as the "power level") is typically determined by the clock frequency and the operating voltage. The CPU 11 can be any type of CPU as long as it is operable at a plurality of levels of frequency, a plurality of levels of operating voltage, or a combination of the frequency and the operating voltage. Examples thereof include a Dual-Core Intel® Xeon® processor and an AMD Opteron™ processor.

Figure 2:
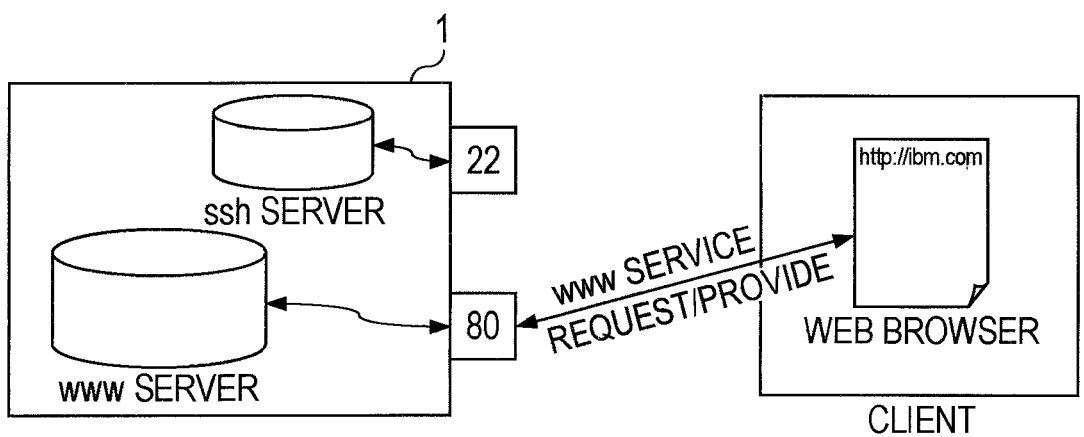
FIG. 2 is a block diagram illustrating an example computer network structure according to an aspect of the present invention.

As illustrated in FIG. 2, the server 1 receives a request for a service from a client computer and provides the client computer with the service via a network. In that communication, a port number is assigned to a communication protocol in advance on the transmission control protocol/internet protocol (TCP/IP). For example, the number 20 is assigned to the file transfer protocol (FTP) (data), the number 21 is assigned to the FTP (control), the number 22 is assigned to the secure shell (ssh), and the number 80 is assigned to the hypertext transfer protocol (HTTP).

In FTP (data), because of burst transfer of data, the CPU 11 needs high power. In FTP (control), because control data input from a keyboard is just transmitted, the power required for the CPU 11 is low. The present invention pays attention to the fact that the power required for the CPU 11 varies with the port number, as described above, and automatically sets an optimal level as the power level of the CPU 11. For example, in the case of the port number 20 (FTP in this example), the power of the CPU 11 is set high. For the port number 21 (FTP control in this example), the power is set low.

Figure 3:
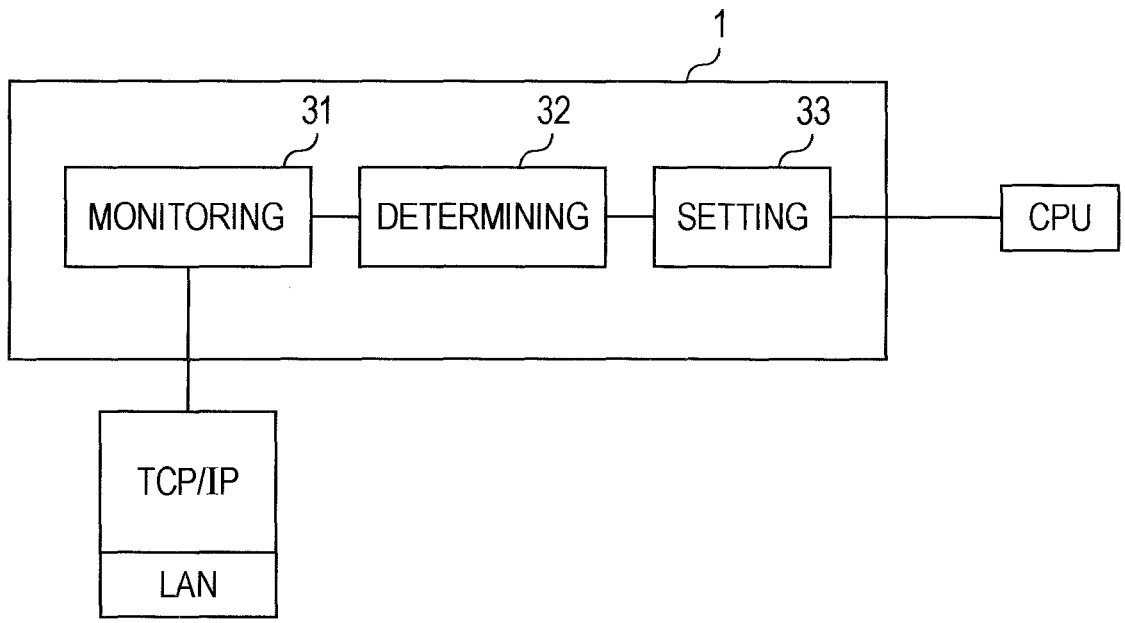
FIG. 3 is a block diagram that illustrates an example server computer system according to an aspect of the present invention.

FIG. 3 is a block diagram that illustrates an example structure of the server 1 according to an aspect of the present invention. The server 1 comprises: a communication monitoring unit 31, a power level determining unit 32, and a power level setting unit 33. The communication monitoring unit 31 monitors a status of communication with a client computer and detects a destination port number. The power level determining unit 32 determines the power level to be set as the power level of the CPU 11 in accordance with the port number. The power level setting unit 33 sets the power level of the CPU to the determined power level.

Figure 4:
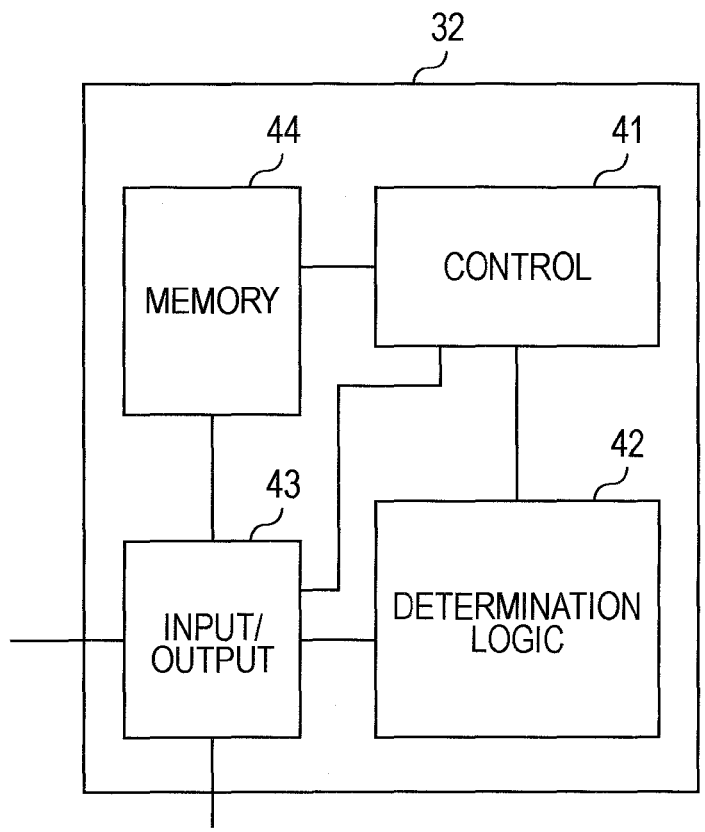
FIG. 4 is a block diagram that illustrates an example structure of a power level determining unit according to an aspect of the present invention.

FIG. 4 is a block diagram that illustrates an example structure of the power level determining unit 32. The power level determining unit 32 comprises: a data input/output unit 43 for reading data from, for example, the communication monitoring unit 31; a memory 44 for storing, for example, the read data; a power level determination logic 42 for determining the power using the data; and a control unit 41 for controlling these units.

The memory 44 stores at least one table in which a port number and a value previously determined based on a load of a service on the CPU 11 identified by the port number are recorded (hereinafter referred to as a "first table"). The load on the CPU 11 may be an average load for a predetermined time period (load average). The load is high for transfer of data encrypted by ssh and low for file transfer by http, for example.

Figures 5, 6:
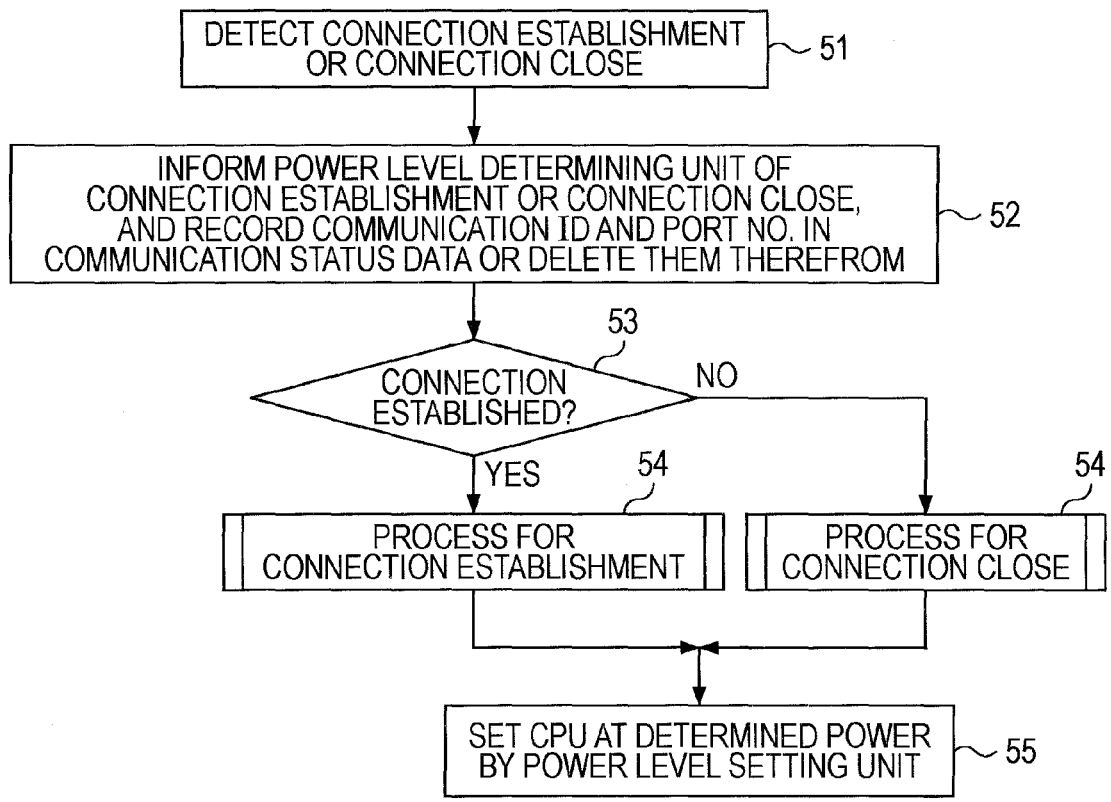
FIG. 5 is a flowchart of a process for setting a power level according to a first embodiment of the present invention.
FIG. 6 is an example communication status data table for the process for setting power levels according to the first embodiment.

FIG. 5 is a flowchart of a process for setting the power level according to a first embodiment of the present invention. The communication monitoring unit 31 monitors a communication status and detects a change of the status, for example, connection establishment of and connection close of communication (step 51). The detection can be made by, for example, monitoring exchange of control packets on the TCP/IP. The connection establishment is detected by detecting that the server 1 sends a control packet indicating permission for connection back to a client computer in response to arrival of a control packet that indicates a request of the connection from the client computer or by detecting arrival of a packet of acknowledgement of receipt from the client computer in response to the control packet of the permission. The connection close is detected by detecting that a control packet that informs end of communication is transmitted from the server 1 or the client computer.

The communication monitoring unit 31 informs the power level determining unit 32 of the connection establishment or connection close (step 52). The communication monitoring unit 31 reads a destination port number. When detecting the connection establishment, the communication monitoring unit 31 records the read port number together with data for identifying the communication, for example, the IP address of the client, in a communication status data table, as illustrated in FIG. 6. When detecting the connection close, the communication monitoring unit 31 deletes data of the communication from the communication status data table.

The power level determining unit 32 responds to the connection establishment or connection close (step 53) and determines the power suited for the CPU 11 on the basis of information in the communication status data table (step 54).

Then, the power level setting unit 33 sets the power level of the CPU 11 to the determined power level (step 55). The setting can be made by, for example, writing of a bit string that indicates the power level into a predetermined I/O port of the CPU.

Figures 7, 8:
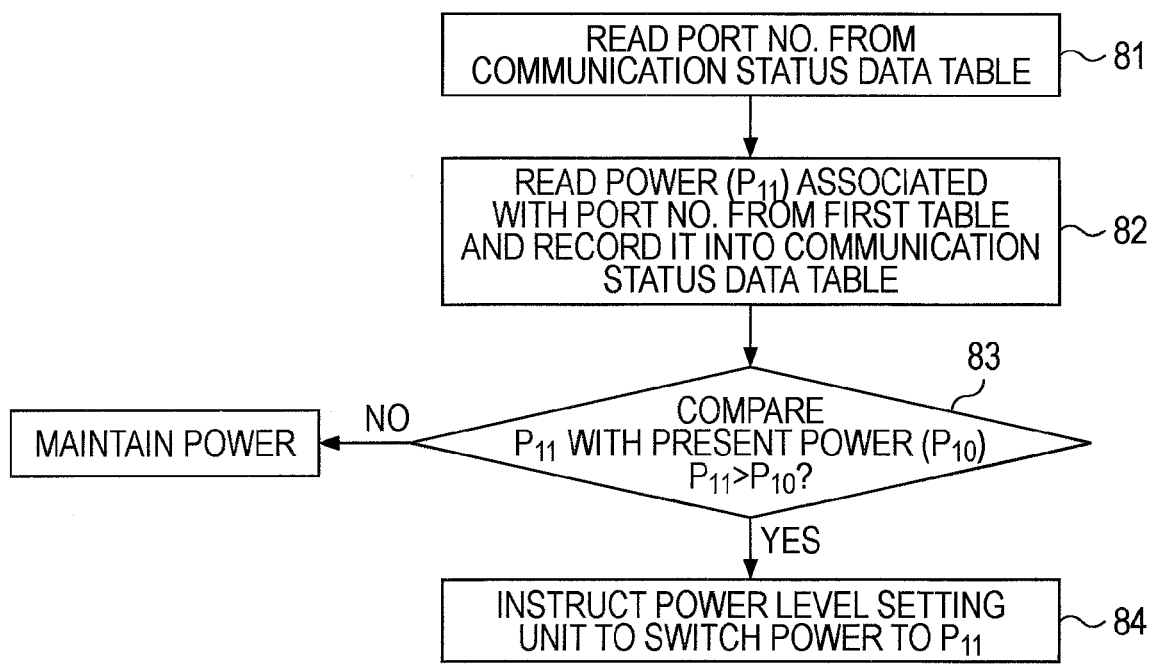
FIG. 7 is an example power level table for the process for setting power levels according to the first embodiment.
FIG. 8 is a flowchart of a process occurring after connection establishment is detected in the process for setting power levels according to the first embodiment.

FIG. 7 illustrates a first table 71 according to the first embodiment of the present invention. In the first table 71, a port number is associated with a power level on the basis of a load imposed on the CPU 11 when an application identified by the port number is processed. The power level is classified into three stages of high, medium, and low, which are represented by numerical values 3, 2, and 1, respectively. Any quantity can be selected as the quantity of port numbers to be controlled. For the port numbers 20 and 80, at which connection is frequently performed, the power level may be controlled among the three stages, whereas, for the other port numbers, the power may be always maintained at the medium level. The power level to be set as the power level of the CPU 11 is determined by use of a value that represents a power level read from the first table 71.

In the first table 71, association of a port number with a power level is made in advance by, for example, a system designer or administrator on the basis of the content of a service identified by the port number. The number of levels is not necessarily three, rather any number can be used.

FIG. 8 is a flowchart of a process occurring when a new connection is established in the first embodiment of the present invention using the above-described first table 71. In response to receipt of a notification that indicates connection establishment, the data input/output unit 43 reads a destination port number for the established communication from the communication status data table (step 81). Then, the data input/output unit 43 reads a power level ($P_{11}$) associated with the destination port number from the first table 71 stored in the memory 44 and records them into the communication status data table, as illustrated in FIG. 6 (step 82). The recorded data on the power level is used when the connection is closed, which will be described later.

Then, the power level determination logic 42 compares the read power level ($P_{11}$) with a present power level ($P_{10}$) stored in the memory 44 (step 83). When $P_{11}>P_{10}$ (YES in step 83), $P_{11}$ is determined as the power level to be set as the power level of the CPU 11. In response to this determination, the data input/output unit 43 instructs the power level setting unit 33 to switch the power level from the present power level $P_{10}$ to $P_{11}$ (step 84). When $P_{11}$ is not larger than $P_{10}$ (NO in step 83), $P_{10}$ is determined as the power level to be set as the power level of the CPU 11, and the power level of the CPU 11 is maintained at $P_{10}$. Thus, when a high load is expected from a detected port number, the power of the CPU is switched to a high level in advance to prepare for subsequent processing, thus leading to prevention of power shortage in the CPU.

Figure 9:
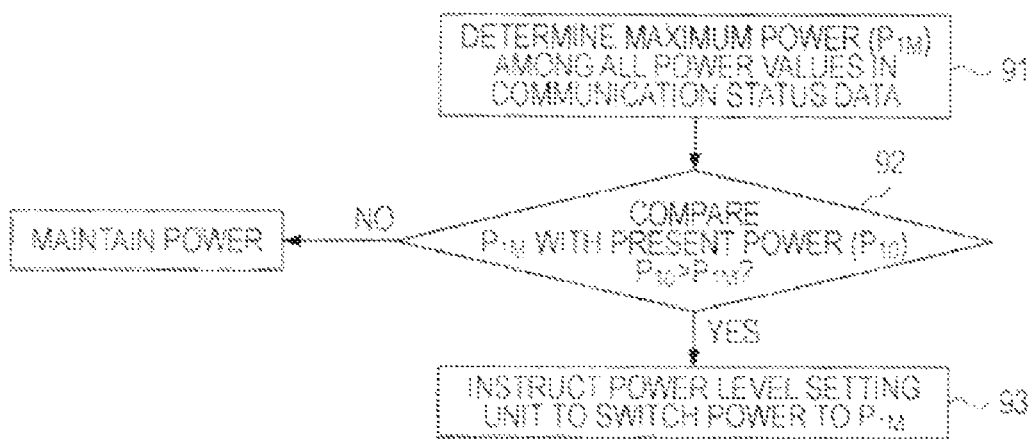
FIG. 9 is a flowchart of a process occurring after connection close is detected in the process for setting power levels according to the first embodiment.

FIG. 9 is a flowchart of a process occurring when connection is closed in the first embodiment. After receiving a notification of connection close, the data input/output unit 43 reads all power-level values from the communication status data table, and then, the power level determination logic 42 determines a maximum power level ($P_{1M}$) among all the values (step 91). The power level determination logic 42 compares the maximum power level ($P_{1M}$) with the present power level ($P_{10}$) (step 92). When $P_{10}>P_{1M}$ (YES in step 92), $P_{1M}$ is determined as the power level to be set as the power level of the CPU, and the data input/output unit 43 instructs the power level setting unit 33 to switch the power level to $P_{1M}$ (step 93). When $P_{10}$ is not larger than $P_{1M}$ (NO in step 92), $P_{10}$ is determined as the power level to be set as the power level of the CPU, and the power level of the CPU is maintained. Thus, after a service that requires high power is closed, the power level is not maintained at high level, thereby attaining power saving.

Even for the same port number, the load on the CPU may be different. For example, when ssh is used in file transfer, many packets must be processed. In contrast, when ssh is used for remote login, the number of packets to be processed is small, so the same power level as in file transfer is not required.

Figure 10:
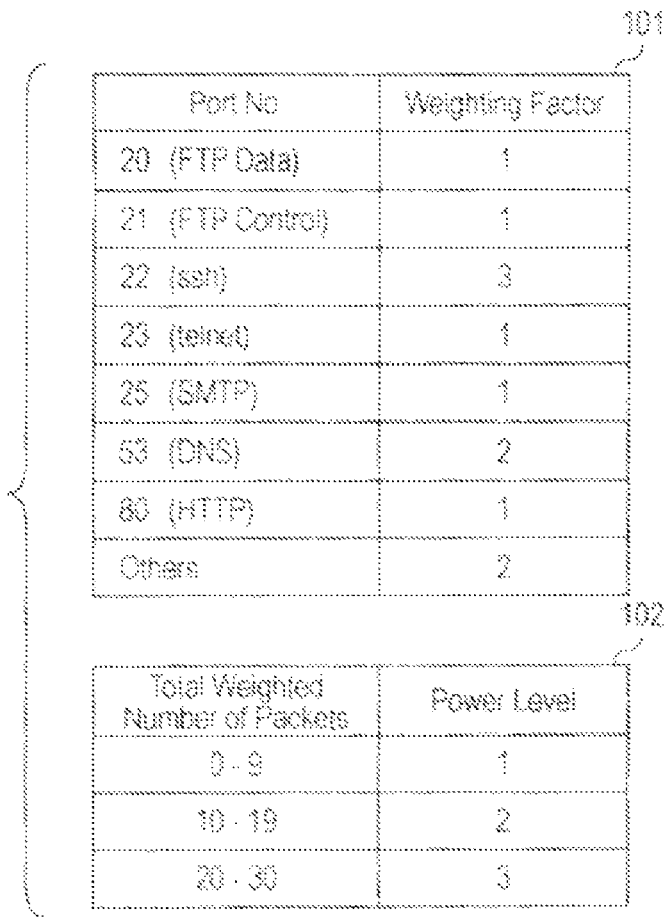
FIG. 10 illustrates example weighting factor and power level tables according to a second embodiment of the present invention.

According to a second embodiment of the present invention, the power level can be determined more minutely by consideration of such a traffic volume. In the present embodiment, at least one traffic volume selected from the group consisting of the number of packets per predetermined time period, the number of simultaneous connections per predetermined time period, and the number of times connection is established per predetermined time period is monitored. The monitoring is performed by, for example, the communication monitoring unit 31. The power level determining unit 32 has a first table 101 in which a weighting factor for a traffic volume is recorded, as illustrated in FIG. 10. The weighting factor is specified in advance by, for example, a system designer on the basis of a load of a service identified by a port number on the CPU before the service starts.

FIG. 11 is a flowchart of a process according to the second embodiment. The communication monitoring unit 31 measures a traffic volume per predetermined time period for each port (step 111). Any period of time can be set as the predetermined time period based on, for example, the intervals of updating of a required power level. If variation in throughput is considerable, it may be a short time. If throughput stays almost constant, it may be a longer time. After a predetermined period of time has elapsed, the communication monitoring unit 31 records port numbers and traffic volumes associated therewith in a communication status data table, as illustrated in FIG. 12 (step 112). After recording has completed, the communication monitoring unit 31 informs the power level determining unit 32 of the updating of the communication status data table (step 113). The power level determining unit 32 weights the traffic volume for each port and calculates a total volume of weighted traffic, and determines the power level to be set as the power level of the CPU 11 on the basis of the total volume of weighted traffic (step 114). The power level setting unit 33 sets the power level of the CPU 11 to the determined power level (step 115). By repetition of steps 111 through 115 for each interval of the predetermined time period, the power level is also changed in accordance with the traffic volume.

Figure 13:
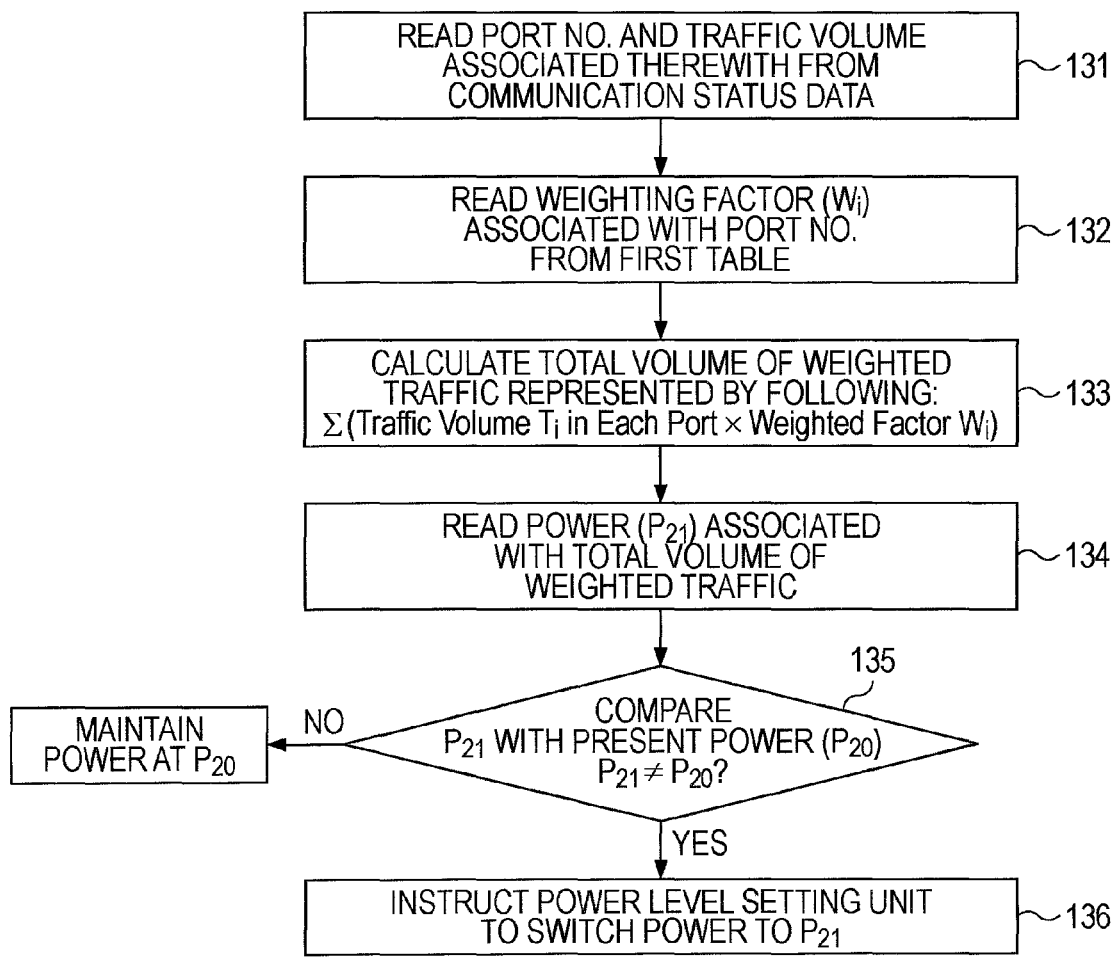
FIG. 13 is a flowchart of a process for determining a power level using a total volume of weighted traffic according to the second embodiment of the present invention.

FIG. 13 is a flowchart of a process for determining a power level performed by the power level determining unit 32 according to the present embodiment. In response to receipt of a notification indicating that the communication status data table has been updated, the data input/output unit 43 reads all destination port numbers and their respective traffic volumes from the communication status data table (step 131). Then, the data input/output unit 43 reads a weighting factor ($W_i$), where i is a port number, associated with each of the port numbers from a first table 101 stored in the memory (step 132).

The power level determination logic 42 of the power level determining unit 32 calculates a total volume of weighted traffic from the expression described below (step 133).

$$\sum_{i=1 \sim n} T_i W_i$$

In the above expression, i is a port number, $T_i$ is a total traffic volume for the port number i, i.e., the sum of traffic volumes if there are a plurality of connections for the port number i, $W_i$ is a weighting factor for the port number i, and n is a maximum value of the port number in the communication status data table. The weighting factor $W_i$ of a port that is not specified in FIG. 10 is a value associated with "Others". For example, when the monitored traffic volume is the number of packets, the number of packets for the port number 20 is 10, the weighting factor for port 20 is 1, the number of packets for the port number 22 is 5, and the weighting factor for port 22 is 3, the total volume of weighted traffic is 25 (=10×1+5×3). When the monitored traffic volume is the number of simultaneous connections, the number of simultaneous connections during a predetermined time period for the port number 22 is 3, and that for the port number 80 is 10, the total volume of weighted traffic is 19 (=3×3+10×1). As described above, by consideration of both the content of processing and the traffic volume, the power level can be controlled more precisely.

According to the present embodiment, in addition to the first table 101, a second table 102 illustrated in FIG. 10 is used. In the second table 102, a predetermined range of a total volume of weighted traffic for a predetermined time period and a power level suited for processing that volume are previously recorded. Alternatively, as will be described later, they are automatically associated after a service starts, and additionally, the association is updated. The second table 102 illustrated in FIG. 10 shows an example in which the traffic volume is the number of packets. However, the traffic volume may be the number of simultaneous connections during a predetermined time period or the number of times connection is established per predetermined time period, or alternatively, it may be a combination of two or more of these items.

Referring back to FIG. 13, a power level ($P_{21}$) associated with the total volume of weighted traffic obtained from the above calculation is read from the second table 102 (step 134). Then, the power level determining unit 32 determines whether the power level ($P_{21}$) differs from a present power level ($P_{20}$) (step 135). When it is different (YES in step 135), the power level determining unit 32 instructs the power level setting unit 33 to switch the power level of the CPU 11 to $P_{21}$ (step 136). When it is the same (NO in step 135), the power level of the CPU 11 is maintained at $P_{20}$. In the case where a plurality of traffic volumes, for example, the number of packets and the number of simultaneous connections are used, before it is initially determined that, for $P_{21}=P_{20}$ in step 135, the power level is maintained at $P_{20}$ with respect to the number of packets, the total volume of weighted traffic with respect to the number of simultaneous connections may be calculated and step 135 may be performed again.

Figure 14:
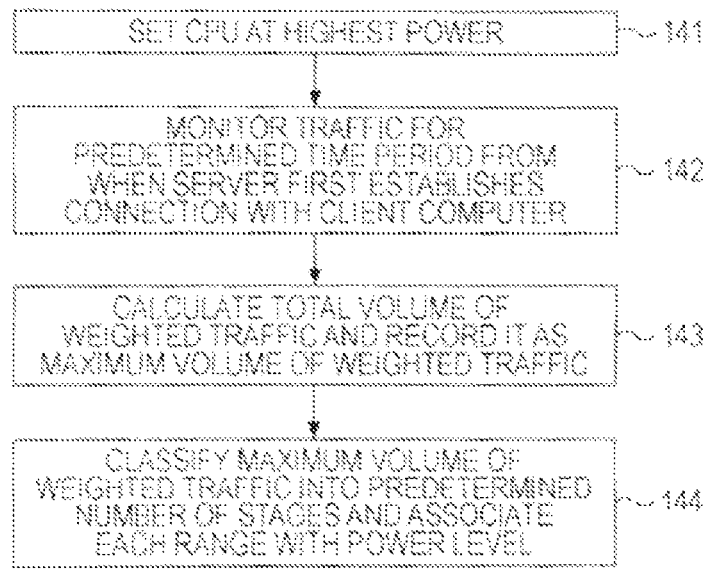
FIG. 14 illustrates a process for generating the second table according to the second embodiment of the present invention.

In the above-described embodiment, the second table 102 is stored before a service starts. However, the second table 102 may be generated based on an actual traffic volume after a service starts or may be updated. FIG. 14 is a flowchart of such a process for generating the second table 102. Although the second table 102 can be generated at any point in time, it is preferable that the second table 102 be generated immediately after a service starts. First, the power level of the CPU is set highest (step 141). The traffic is monitored for a predetermined period of time from when the server 1 first establishes connection with the client computer, that is, from when step 131 illustrated in FIG. 13 is performed (step 142). Then, the total volume of weighted traffic is calculated, as in step 133 illustrated in FIG. 13, and this calculated value is recorded as the maximum volume of weighted traffic (step 143). The maximum volume of weighted traffic is classified into a predetermined number of stages, and each stage is associated with a power level (step 144). For example, the maximum volume of weighted traffic is classified into three evenly spaced portions, and, from the highest level, the three portions are associated with high, medium, and low power levels, respectively. The number of stages may be any number. The intervals are not necessarily uniform. For example, the maximum volume of weighted traffic may be multiplied by coefficients, for example, 1.0, 0.8, and 0.5, and the resultants may be associated with three power levels of high, medium, and low, respectively.

Figure 15:
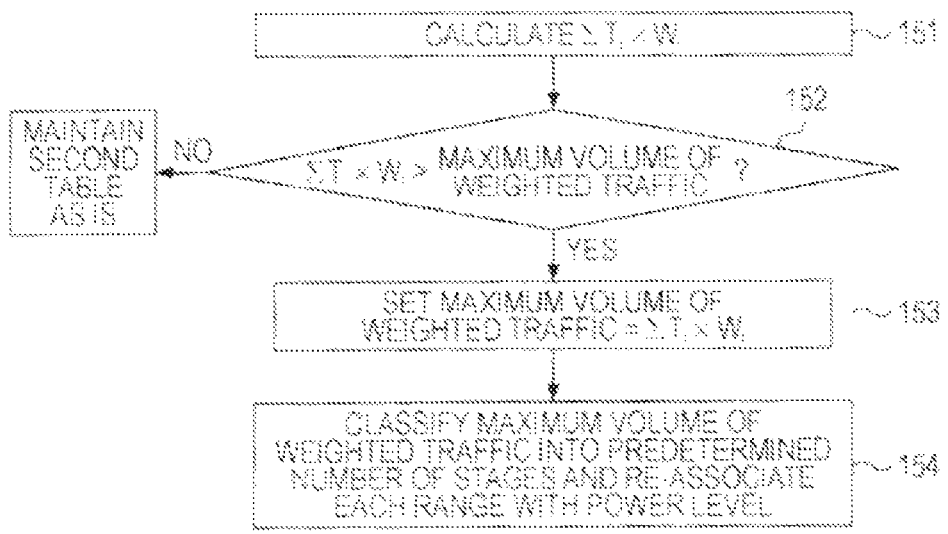
FIG. 15 is a flowchart of a process for updating the second table according to the second embodiment of the present invention.

After a service is provided using the second table 102, the traffic volume may significantly increase and the total volume of weighted traffic may exceed the above-described maximum volume of weighted traffic. To address such a case, a step of updating the second table is performed after the generation described above. FIG. 15 is a flowchart of such an updating process. First, step 131 illustrated in FIG. 13 is performed. Then, the total volume of weighted traffic is calculated, as in step 133 illustrated in FIG. 13, (step 151). It is determined whether the obtained total volume of weighted traffic exceeds the above-described maximum volume of weighted traffic (step 152). When it doesn't exceed the maximum (No in step 152), the second table is maintained as is. When it exceeds the maximum (YES in step 152), the total volume of weighted traffic is recorded as a new maximum volume of weighted traffic (step 153). The new maximum volume of weighted traffic is classified into the above predetermined number of stages, and each stage is re-associated with a power level, thus updating the second table (step 154). This process may be performed at predetermined time intervals after a service starts. Alternatively, the maximum volume of weighted traffic may be set as zero by default, and the process illustrated in FIG. 15 may be always repeated. Alternatively, an administrator of the server system may manually instruct the server system to perform this process.

Changes in the second table 102 and power level occurring when the second table is generated and updated, described above, using the number of packets as the traffic volume will be described below with reference to FIG. 16. When the maximum weighted number of packets is 20 immediately after a service starts (it is assumed that $t=t_0$), the second table illustrated in FIG. 16-$a$ is generated, and the power level of the CPU 11 is set at 3. At time $t_1$, the total weighted number of packets is 10, and the power level of the CPU 11 is switched to 2 (FIG. 16-$b$). At time $t_2$, when the total weighted number of packets exceeds the maximum weighted number of packets and reaches 60, the second table is updated as illustrated in FIG. 16-$c$ and the power level of the CPU is switched to 3 again. At time $t_3$, the total weighted number of packets is 30, and the power level of the CPU is switched to 2 (FIG. 16-$d$).

In the foregoing, an embodiment in which the power level is determined based on a port number and an embodiment in which the power level is determined also in consideration of a traffic volume are described. These embodiments can be combined. For example, at the time a service starts, as in the second embodiment, i.e., the power level may be controlled based on both the traffic volume and the port number, and, after the status of the traffic is checked, the power level may be determined based on only the port number.

The invention can take the form of a computer program product accessible from a computer usable or computer readable medium providing program code for use by or in connection with a server computer. For the purposes of this description, a computer usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer readable medium include a semiconductor or solid state memory, magnetic tape, a removable computer diskette, a random access memory (RAM), a read only memory (ROM), a rigid magnetic disc and an optical disc. Current examples of optical disks include compact disc-read only memory (CD-ROM), compact disc-read/write (CD-R/W) and DVD.

The invention claimed is:

1. A server computer system including a central processing unit (CPU) operable at a plurality of levels of power, the server computer system providing a service that follows a predetermined protocol identified by a port number to a client computer via a computer network, the server computer system comprising:
   a communication monitoring unit for monitoring a status of communication with the client computer and retaining a communication status data table that contains a connection ID and a port number for the communication;
   a power level determining unit for determining a power level to be set as a power level of the CPU on the basis of data in the communication status data table; and
   a power level setting unit for setting the power level of the CPU to the determined power level;
   wherein the power level determining unit includes at least one table that stores a port number and a value previously determined based on a load of a service identified by the port number on the CPU.

2. The server computer system according to claim 1, wherein the power level determining unit includes:
   a controller for reading the value from the at least one table and recording the value in the communication status data table; and
   a power level determination logic for determining the power level using the value read from the at least one table.

3. The server computer system according to claim 1, wherein the value represents a power level associated with a port number.

4. The server computer system according to claim 1, wherein the value is a weighting factor for at least one traffic volume selected from the group consisting of the number of packets per a predetermined time period, the number of simultaneous connections per a predetermined time period, and the number of times connection is established per a predetermined time period.

5. The server computer system according to claim 4, wherein the communication monitoring unit includes a counter for counting the at least one traffic volume.

6. A method for setting a power level of a central processing unit (CPU) included in a server computer system, the CPU being operable at a plurality of levels of power, the server computer system providing a service that follows a predetermined protocol identified by a port number to a client computer via a computer network, the method comprising:
   a monitoring step of monitoring connection establishment of or connection close of communication with the client computer and a port number for the established or closed communication;
   a determining step of determining a power level to be set as the power level of the CPU in accordance with the port number; and
   a setting step of setting the power level of the CPU to the determined power level;
   wherein the determining step includes a step of reading a value from a first table that stores a port number and a value previously determined based on a load on the CPU of a service identified by the port number, and recording the value in the communication status data table.

7. The method according to claim 6, wherein the value represents a power level of the CPU, and
   when connection establishment is detected in the monitoring step, the determining step includes:
   a step of comparing the read value for power level ($P_{11}$) with a present power level ($P_{10}$); and
   a step of, when $P_{11}$ is higher than $P_{10}$, determining that the power level to be set is $P_{11}$ and, otherwise, determining that the power level to be set is $P_{10}$.

8. The method according to claim 6, wherein the value represents a power level of the CPU, and
   when connection close is detected in the monitoring step, the determining step includes:
   a step of determining a maximum power level ($P_{1M}$) in the communication status data table; and
   a step of comparing the maximum power level ($P_{1M}$) with the present power level ($P_{10}$) and, when $P_{1M}$ is lower than $P_{10}$, determining that the power level to be set is $P_{1M}$ and, otherwise, determining that the power level to be set is $P_{10}$.

9. A method for setting a power level of a central processing unit (CPU) included in a server computer system, the CPU being operable at a plurality of levels of power, the server computer system providing a service that follows a predetermined protocol identified by a port number to a client computer via a computer network, the method comprising:
   a monitoring step of monitoring connection establishment of or connection close of communication with the client computer and a port number for the established or closed communication;
   a determining step of determining a power level to be set as the power level of the CPU in accordance with the port number; and
   a setting step of setting the power level of the CPU to the determined power level;
   wherein the monitoring step includes a step of measuring, for each port number, at least one traffic volume selected from the group consisting of a number of packets per a predetermined time period, a number of simultaneous connections per a predetermined time period, and a number of times connection is established per a predetermined time period and recording the port number and the traffic volume in the communication status data table, and
   the determining step includes a step of reading, a value from a first table that stores a port number and the value previously determined based on a load of a service identified by the port number on the CPU.

10. The method according to claim 9, wherein the monitoring step includes a step of measuring the at least one traffic volume and recording the at least one traffic volume in the communication status data table, and
   the determining step repeats, at predetermined time intervals, the steps of:
   (i) calculating a total volume of weighted traffic from the following expression:

$$\sum_{i=1 \sim n} T_i W_i$$

where i is a port number, $T_i$ is a total traffic volume for the port number i, $W_i$ is a weighting factor for the port number i, and n is a maximum value of the port number in the communication status data table;
   (ii) reading a power level ($P_{21}$) previously associated with the obtained total volume of weighted traffic from a second table; and
   (iii) comparing the read power level ($P_{21}$) with a present power level ($P_{20}$), determining that the power level to be set is $P_{21}$ when $P_{21}$ is not the same as $P_{20}$, and determining that the power level to be set is $P_{20}$ when $P_{21}$ is the same as $P_{20}$.

11. The method according to claim 10, further comprising, before the monitoring step, a step of generating the second table, the step of generating the second table including the steps of:
   (i) setting the power level of the CPU at a highest level;
   (ii) recording the total volume of weighted traffic in a predetermined period of time from when the server computer system first establishes connection with the client computer as a maximum volume of weighted traffic; and
   (iii) classifying the maximum volume of weighted traffic into a predetermined number of stages and associating each of the stages with a power level.

12. The method according to claim 11, further comprising a step of updating the second table by, in response to the total volume of weighted traffic exceeding the maximum volume of weighted traffic, recording the total volume of weighted traffic as a new maximum volume of weighted traffic, classifying the new maximum volume of weighted traffic into the predetermined number of stages, and associating each of the stages with a power level.

13. A computer program product comprising a computer-readable medium having encoded thereon computer executable program code for setting a power level of a central processing unit (CPU) included in a server computer system, the CPU being operable at a plurality of levels of power, the server computer system providing a service that follows a predetermined protocol identified by a port number to a client computer via a computer network, the computer program product comprising:

program instructions for monitoring connection establishment of or connection close of communication with the client computer and a port number for the established or closed communication;

program instructions for reading a value from a first table that stores a port number and a value previously determined based on a load on the CPU of a service identified by the port number, and recording the value in the communication status data tabl to determine a power level to be set as the power level of the CPU in accordance with the port number by; and program instructions for setting the power level of the CPU to the determined power level.

* * * * *